Inventor
Peter J. Morroni
By Charles R. Fay
Attorney

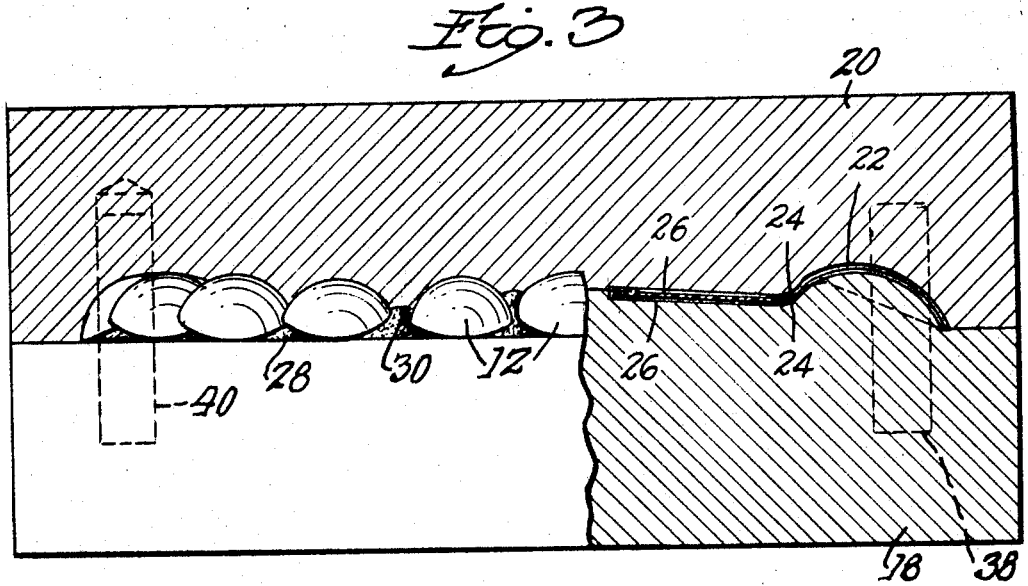
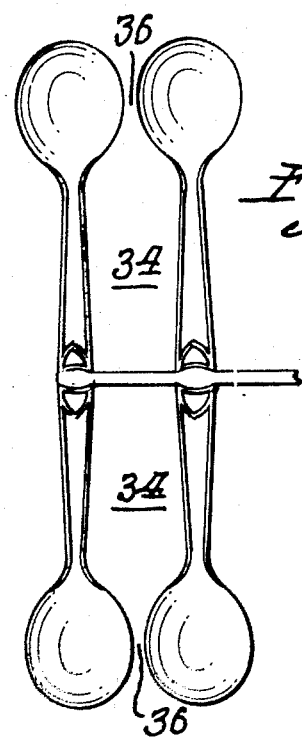
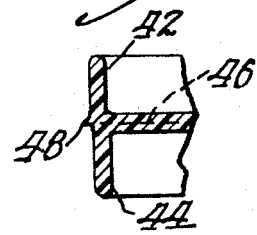
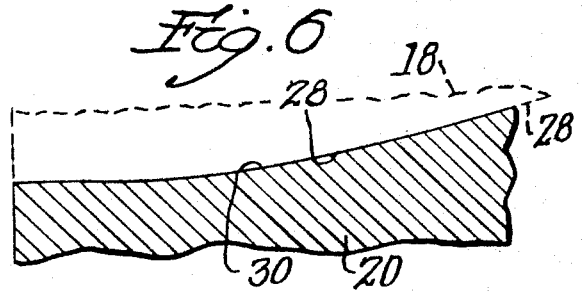
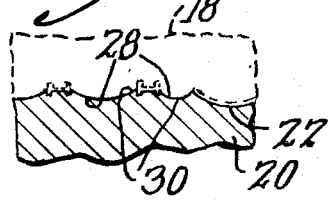

United States Patent Office 3,456,301
Patented July 22, 1969

3,456,301
MOLD HAVING COMPLEMENTAL NON-PLANAR MATING AREAS FOR PARTING SURFACES BETWEEN THE MOLD CAVITIES
Peter J. Morroni, 177 Florence St.,
Leominster, Mass. 01453
Continuation-in-part of application Ser. No. 532,183, Mar. 7, 1966. This application May 10, 1967, Ser. No. 637,390
Int. Cl. B29f 1/00; B29c 1/00
U.S. Cl. 18—42                                        5 Claims

ABSTRACT OF THE DISCLOSURE

A mold for injection molding of plastic articles, said mold including two mating parts each of which is provided with cavities to mold irregularly shaped objects e.g. spoons, which are not coplanar, the mating parts of the mold consequently being provided with interengaging irregular non-planar surfaces at the parting line, which surfaces are not parts of the cavities but which interfit each other, and completely prevent any kind of relatively lateral shifting of one die part relative to the other die plate.

Summary

In the field of plastic injection molding, the parts of the mold after use become worn and tend to shift very slightly one with respect to the other distorting the objects which are being molded. The injected plastic material enters the closed mold parts under high pressures and tends to cause shifting between them. When this happens, the usual guide-pins must be renewed and in many cases the dies reworked to some extent resulting in a great deal of expense; but with the present invention, which is directed to the fact that the articles being molded require interfitting non-planar surfaces between cavities, i.e., non-cavity irregular parting surfaces, there is no possible shifting of the molds regardless of the length of use to which the same is put.

This application is a continuation-in-part of my prior application Ser. No. 532,183 filed Mar. 7, 1966, now abandoned, and relates to molds for the injection molding of plastic articles where the articles themselves are such as to allow the provision of interfitting portions of the mold parts between cavities to be in non-planar relationship at the parting line, so that it may be said that the parting line of the mold of the present invention, even in areas where there is no cavity, interfit in such a way that they are completely immovable with respect to each other when the die parts are closed, thus preventing any kind of shifting and therefore resulting in the prevention of molded articles being made except exactly as desired.

For instance, in the molding of such articles as forks and spoons which have irregularly curved surfaces such as the bowls and curved tines, etc., the mold is made in such a way that the interfitting portions of the mold part faces, i.e., at the parting line, are non-planar, i.e., not flat, and they interfit in at least two directions so that it is impossible for one mold part to shift relative to the other mold part.

Especially in the molding of spoons and forks if the mold plates shift as is the case in the prior art molds for these articles, a sharp edge is made which is very deleterious to the finished product; whereas with the present invention, it is impossible for such shifting to take place and such sharp edges cannot be produced, even after die wear.

In order to carry out the present invention, it is necessary to form the cavities in a circle, semi-circle, or on the arc of a circle as distinct from forming the cavities in parallelism with each other and running a sprue from one to the other. By forming the mold with the cavities arranged on the arc of a circle as stated, it is possible to provide a sprue to only one or two of the items, parts of the items themselves providing the necessary path for the molten plastic material to be injected under pressure, but more important at the same time by arranging the articles in the cavities in the molds in this manner, there is provided interengaging irregular sections of the mold faces as distinct from flat-faced molds or flat parting line molds so that the interengaging members out of the general plane of the parting line, interfit closely with each other and act as relative motion-restraining means.

Other objects and advantages of the invention will appear hereinafter.

Reference is to be had to the accompanying drawings in which:

FIG. 3 is a combined view showing one part of the mold in elevation and the other part in section illustrating how they interfit;

FIG. 4 shows the prior art arrangement of molding the same articles;

FIG. 5 is a sectional view on an enlarged scale of an article illustrating the results of slippage of the die plates under conditions of wear; and FIGS. 6 and 7 are enlarged sectional views of parts of the mold.

Figure 1:
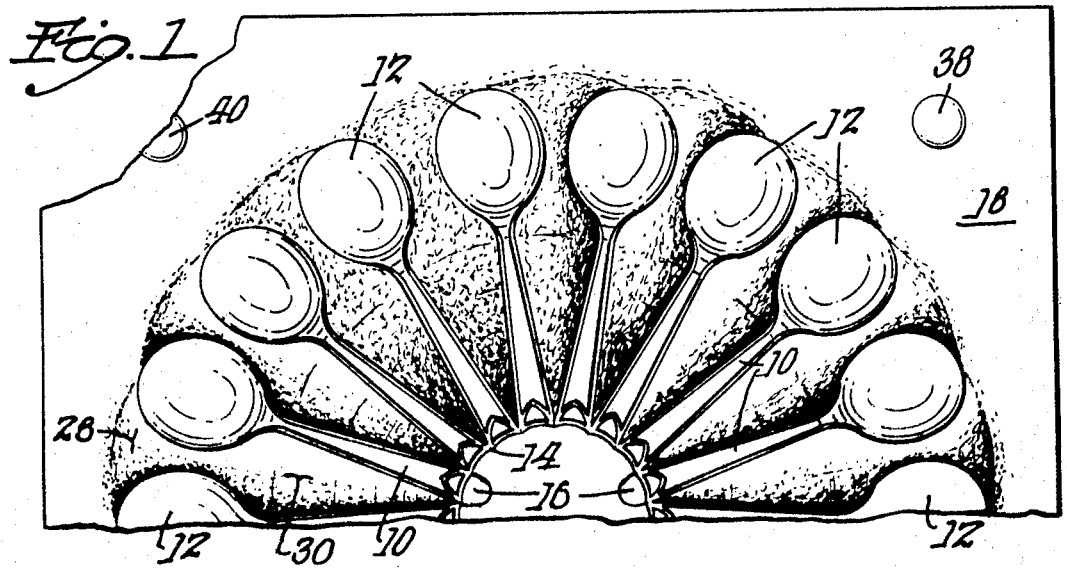
FIG. 1 is a plan view of one of the parts of the new mold.

In order to explain the present invention, it is illustrated as being applied to the molding of a set of spoons. Each spoon has a relatively elongated handle 10 and a bowl 12. These same spoons may be molded in parallel relation as shown in FIG. 4 which illustrates the prior art for molding the same spoons as shown in FIG. 1. Molded in this manner, all the mold part areas between cavities are flat.

In this invention, the most practical manner to arrange the spoons is in a full circle, although this is not necessary to the carrying out of the invention. The articles can be arranged on a semi-circle or on part of a circle or other curve, but in any event they all have terminal end portions as shown at 14 which are continuous and which serve to accommodate the passage of the molten plastic as for instance from a sprue 16 or the like. Other forms of sprues may also be used without departing from the scope of the invention, and it will be observed that the present arrangement makes for an extremely practical use of a major portion of the die part surfaces as compared to the prior art, FIG. 4.

The parting line of the die insofar as the cavities are concerned is approximately at the edge of the spoon. However as shown in FIG. 3, the two die parts 18 and 20 are actually male and female parts not only insofar as the cavities at 22 are concerned but also in the areas at 24, 26, etc., which are not parts of the cavities but are parts of the die faces between cavities as shown in the areas in FIG. 1, indicated at 28 and 30. In the areas 28 and 30, the material of the die parts come solidly together at each injection and it will be noted that they are not coplanar or flat as is the case in the prior art in the areas between the cavities such as indicated at 34, 34, 36 in FIG. 4.

The reference numerals 38 and 40 represent guide pins received in openings therefor which are commonly found on injection molding dies. These pins of course wear and after even a slight wear they usually allow the two die parts to shift slightly laterally with respect to each other. This shifting of course occasions an imperfection in the article being molded and this is illustrated in FIG. 5.

Supposing for instance that the portion of the article which is indicated at 42 is molded in one part of the die and the portion 44 is molded in another part of the die, the parting line being at 46, the shifting of part 42 to the left with reference to part 44 causes the parts to be slightly misaligned and this creates a sharp edge at 46, plus flash. The amount of shifting is extremely minute but it can be detected in the finished article by the naked eye and also by feel because it provides a sharpness which is uncomfortable to the lips if this should appear around the edges of the bowl of the spoon for instance.

Figure 2:
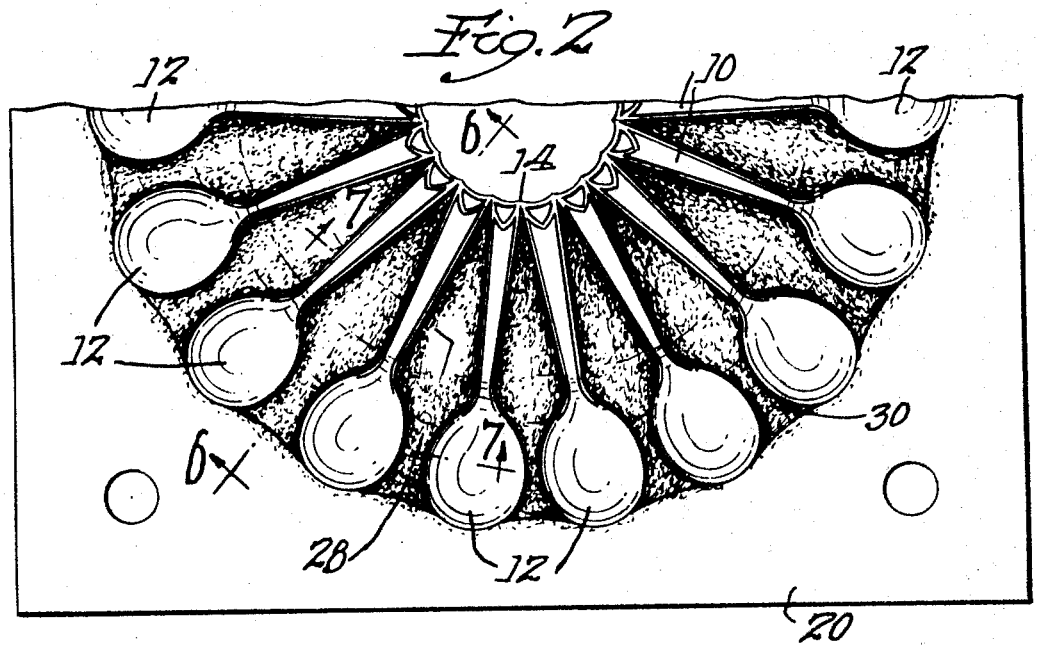
FIG. 2 is a plan view of the other part of the new mold.

Now in the case of the molding of exactly the same spoon shown in FIG. 1 but by the prior art method shown in FIG. 4, the die plates can shift in one direction only, but this is sufficient to cause the deleterious sharp edge 48. By arranging the implements in the form of a circle or on an arc as illustrated in FIGS. 1, 2 and 3, the inter-engaging non-coplanar parts of the dies which do not form the cavities, engage each other and effectively block shifting in any direction. Where the implements are aligned parallelly, the die plates can shift in one direction. In many dies, the die parts can shift in any direction in a single plane at the parting line but in the present invention, no shifting of any kind is possible and therefore the sharp edges 48 are completely avoided.

This effect may be referred to as the "miter" of the dies. In other words, the dies are mitered so that they cannot shift because of the use of the present invention applied to the implements as shown. They are molded not in a straight line where they are parallel but in non-parallel relationship, i.e. as on the arc of a circle.

Having thus described my invention and the advantages thereof, I do not wish to be limited to the details herein disclosed, otherwise than as set forth in the claims, but what I claim is:

1. In a mold for a plastic injection molding machine comprising at least two mold parts, means forming partial spaced elongated cavities on each of said parts so that when the mold is closed, spaced full elongated cavities are formed, the outer extremities of said elongated cavities being arranged on the arc of a curve, that improvement which resides in the provision of complemental mating mold part areas between said elongated cavities, said complemental mating areas extending for a substantial distance along the lengths of the cavities, said complemental mating areas coming into firm contact upon closure of the mold, said complemental mating areas between said elongated cavities having non-planar surfaces.

2. The mold recited in claim 1 wherein said non-planar surfaces of each mating area are at angles with relation to each other.

3. The mold recited in claim 1 wherein at least a portion of said non-planar surfaces of each mating area is curved.

4. The mold of claim 1 wherein said arc of a curve is a substantial circle, and the complemental mating areas between said cavities are arranged on the radii of said circle.

5. The mold of claim 1 wherein said full elongated cavities are each shaped to form an eating utensil.

References Cited
UNITED STATES PATENTS

| | | |
|---|---|---|
| 1,227,534 | 5/1917 | Frankland. |
| 1,394,037 | 10/1921 | Mallory. |
| 1,408,533 | 3/1922 | Pullen. |
| 1,628,257 | 5/1927 | Mallory. |
| 2,087,014 | 7/1937 | Becker. |
| 2,275,591 | 3/1942 | Leonard _____ 249—187 X |
| 2,357,950 | 9/1944 | Goessling. |
| 2,366,475 | 1/1945 | Bartholomew _____ 249—59 |
| 2,454,847 | 11/1948 | Slack. |
| 2,523,924 | 9/1950 | Sawyer _____ 264—157 X |
| 2,541,249 | 2/1951 | Hobson _____ 249—119 X |
| 2,733,479 | 2/1956 | English. |
| 3,095,610 | 7/1963 | Sawyer. |

J. HOWARD FLINT, Jr., Primary Examiner

U.S. Cl. X.R.

30—324; 249—119, 205